US012654678B2

(12) United States Patent
     Choi et al.

(10) Patent No.:   US 12,654,678 B2
(45) Date of Patent:        Jun. 16, 2026

(54) SYSTEM AND METHOD FOR MONITORING TORQUE IN A HYBRID ELECTRIC VEHICLE

(71) Applicants:HYUNDAI MOTOR COMPANY, Seoul (KR); KIA CORPORATION, Seoul (KR)

(72) Inventors: Jung Yong Choi, Pohang-si (KR); Jae Hyoung Jeong, Seoul (KR); Hyung Min Kim, Ansan-si (KR); Hyeok Jun Kwon, Seoul (KR); Sang Won Lee, Hwaseong-si (KR); Yeon Bok Kim, Seongnam-si (KR); Jung Suk Han, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 119 days.

(21) Appl. No.: 18/630,835

(22) Filed:     Apr. 9, 2024

(65)              Prior Publication Data

US 2025/0196843 A1      Jun. 19, 2025

(30)         Foreign Application Priority Data

Dec. 13, 2023    (KR) ........................ 10-2023-0180263

(51) Int. Cl.
     *B60W 20/50*           (2016.01)
     *B60W 10/06*           (2006.01)
     (Continued)
(52) U.S. Cl.
     CPC ............ *B60W 20/50* (2013.01); *B60W 20/15* (2016.01); *B60W 10/06* (2013.01); *B60W 10/08* (2013.01);
     (Continued)

(58) Field of Classification Search
     CPC ...... B60W 20/50; B60W 20/15; B60W 10/06; B60W 10/08; B60W 2510/244;
                              (Continued)

(56)              References Cited

U.S. PATENT DOCUMENTS 7,286,915 B2    10/2007  Lee
    12,122,349 B1 *  10/2024  Amstutz ............... B60W 10/08
                      (Continued)

FOREIGN PATENT DOCUMENTS

KR        20070050997 A      5/2007

OTHER PUBLICATIONS

F. Yan, J. Wang and K. Huang, "Hybrid Electric Vehicle Model Predictive Control Torque-Split Strategy Incorporating Engine Transient Characteristics," in IEEE Transactions on Vehicular Technology, vol. 61, No. 6, pp. 2458-2467, Jul. 2012, doi: 10.1109/TVT. 2012.2197767. keywords: {Torque;Hybrid electric vehicles;Tr.*
                      (Continued)

*Primary Examiner* — Brian P Sweeney
(74) *Attorney, Agent, or Firm* — Lempia Summerfield Katz LLC

(57)              ABSTRACT

A system and method for monitoring a torque in a hybrid electric vehicle are capable of preventing misdiagnosis in determining whether there is an abnormality in generating torque commands. Accordingly, torque monitoring may be accurately performed. The method includes comparing a command torque limit value determined by adding a compensation value to a request torque to be monitored with a sum of command torques for each power source, among power sources in the hybrid electric vehicle, to determine whether there is an abnormality in generating a torque command for a power source in the hybrid electric vehicle. The method also includes limiting the compensation value added to the request torque to be monitored to calculate the (Continued)

< Prior Art >

< Present Disclosure > command torque limit value to a driving system limit value at vehicle level.

16 Claims, 5 Drawing Sheets

(51) Int. Cl.
*B60W 10/08* (2006.01)
*B60W 20/15* (2016.01)

(52) U.S. Cl.
CPC ... *B60W 2510/244* (2013.01); *B60W 2540/10* (2013.01); *B60W 2710/0666* (2013.01); *B60W 2710/083* (2013.01)

(58) Field of Classification Search
CPC ..... B60W 2540/10; B60W 2710/0666; B60W 2710/083; B60W 50/038; B60W 50/04; B60W 2050/021; B60W 2510/0657; B60W 2510/083; B60W 2510/242; Y02T 10/62

See application file for complete search history.

(56) References Cited

U.S. PATENT DOCUMENTS

| | | | | |
|---|---|---|---|---|
| 2007/0102206 A1* | 5/2007 | Lee | ..................... | B60W 10/26 903/910 |
| 2015/0151736 A1* | 6/2015 | Kim | ..................... | B60W 20/10 180/65.265 |

OTHER PUBLICATIONS

Model Predictive Control Torque-Split Strategy (Year: 2012).*

* cited by examiner

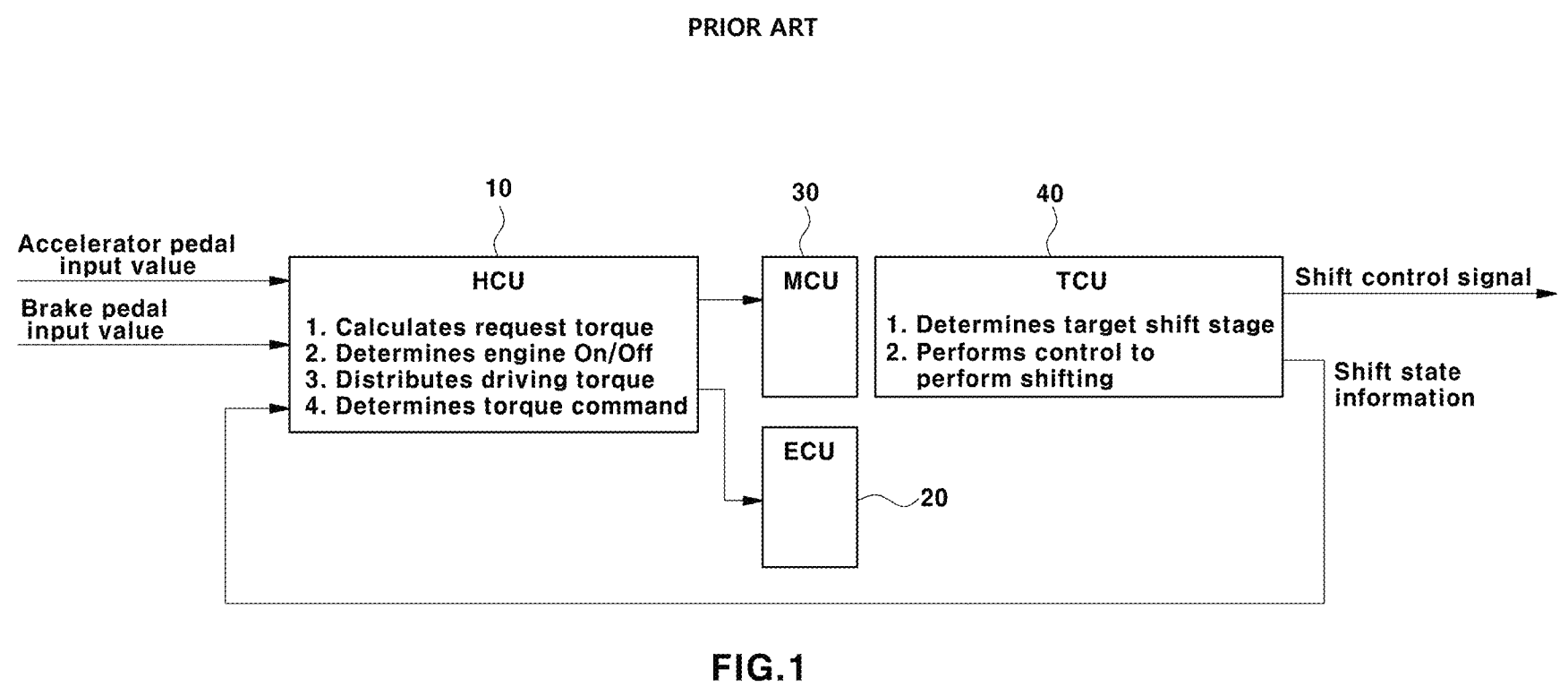

PRIOR ART

Shift control signal

Shift state
information

TCU

40

1. Determines target shift stage
2. Performs control to
   perform shifting

MCU

30

ECU

20

HCU

10

1. Calculates request torque
2. Determines engine On/Off
3. Distributes driving torque
4. Determines torque command Accelerator pedal
input value Brake pedal
input value

FIG.1

SYSTEM AND METHOD FOR MONITORING TORQUE IN A HYBRID ELECTRIC VEHICLE

CROSS-REFERENCE TO RELATED APPLICATION

This application claims, under 35 U.S.C. § 119(a), the benefit of and priority to Korean Patent Application No. 10-2023-0180263, filed on Dec. 13, 2023, the entire contents of which are incorporated herein by reference.

TECHNICAL FIELD

The present disclosure relates to a system and method for monitoring torque in a hybrid electric vehicle.

BACKGROUND

A hybrid electric vehicle is a vehicle that travels using an engine (an internal combustion engine) and a motor as power sources. The hybrid electric vehicle typically includes a powertrain. For example, the hybrid electric vehicle may include a transmission mounted electric device (TMED) type hybrid system.

In the TMED-type hybrid system, an engine clutch is disposed between the engine and the motor, which are driving devices to drive the vehicle. Further, a transmission is connected to the output side of the motor. Moreover, an inverter to drive and control the motor is mounted in the vehicle. The motor is chargeably and dischargeably connected to a high-voltage main battery in the vehicle via the inverter.

During motor driving, the inverter converts direct current (DC) supplied from the battery into alternating current (AC) and applies the same to the motor via a power cable. During motor regeneration, the inverter converts AC generated in the motor into DC and supplies the same to the battery.

Furthermore, the vehicle is equipped with a motor, i.e., a hybrid starter and generator (HSG), that is a starter generator connected to the engine to enable constant power transmission so as to start the engine or generate power using rotational power transmitted from the engine. Like the motor for driving the vehicle, the HSG may operate as both a motor and a generator, and is chargeably and dischargeably connected to the battery via the inverter.

In the hybrid electric vehicle, a regenerative mode, in which a vehicle's kinetic energy is recovered as an electric energy through power generation by the motor during coasting due to inertia or braking to charge the battery, is performed. In the hybrid electric vehicle, the function of regenerative mode is essential to increase vehicle efficiency and improve fuel efficiency.

Moreover, in the hybrid electric vehicle, power needs to be appropriately distributed to the engine and to the motor to minimize fuel consumption and improve vehicle fuel efficiency. A process of determining a target operating point and generating engine torque commands and motor torque commands in the TMED-type hybrid electric vehicle is as follows.

FIG. 1 is a block diagram showing the structure of a control system configured to perform power control and shift control in the hybrid electric vehicle. As shown in FIG. 1, in the hybrid electric vehicle, a plurality of controllers 10 to 40 performs cooperative control for power control and shift control in the vehicle.

First, a hybrid control unit (HCU) 10, which may be considered a higher-level controller, determines a driver request torque depending on driver's travel intention based on vehicle operation information, such as a driver's accelerator pedal input value (APS value) and a brake pedal input value (BPS value).

Here, among driver's operation input values, the accelerator pedal input value may be detected by an accelerator pedal position sensor (APS), and the brake pedal input value may be detected by a brake pedal position sensor (BPS).

Moreover, the HCU 10 determines engine on/off mode (i.e., travel mode) to satisfy the driver request torque, and distributes torque to driving devices based on the determined driver request torque and engine on/off mode information.

The HCU 10 determines engine torque and motor torque to satisfy the driver request torque depending on the distribution ratio and distribution torque profile for power distribution, and then generates and outputs a torque command for each power source.

Thereafter, an engine control unit (ECU) 20 and a motor control unit (MCU) 30 receive an engine torque command and a motor torque command, respectively, from the HCU 10, and control the torques of the engine and motor according to each received torque command.

Along with the power control in the vehicle described above, shift control is performed. Here, a transmission control unit (TCU) 40 determines a target shift stage based on information collected in the vehicle and controls the operation of the transmission so that shifting to the target shift stage is performed.

Furthermore, the TCU 40 provides current shift state information, such as target shift stage, shift class, and shift phase, to the HCU 10. The HCU 10 performs torque intervention control, etc. referring to the shift state information.

In a conventional system, the HCU, which is a higher-level controller, or a vehicle domain control unit (VDCU) in the conventional TMED vehicle is not capable of detecting excessive torque relative to driver demand, which may occur due to software or hardware errors in a basic control logic for torque determination and command generation for each power source (engine, motor, and HSG).

For this reason, so as to secure safety in acceleration and deceleration at vehicle level, a torque monitoring logic capable of monitoring the torque determination and command generation in the basic control logic is being developed and applied to the vehicle.

In applying the torque monitoring logic as described above, conventionally, due to the limitations of microcomputers, the basic control logic is shortened and torque determination and command generation in the shortened basic control logic is monitored.

However, according to the conventional torque monitoring logic, errors might occur in the process of receiving the torque command value calculated in the basic control logic and diagnosing abnormalities, such as errors in torque determination and command generation in the basic control logic and hardware failure, thereby misdiagnosing abnormalities.

For example, external intervention torques, such as shift, active shift control (ASC), traction control system (TCS), received from other controllers must be reflected in the torque distribution logic that determines final torque command values for each power source (engine, motor, and HSG). However, when an error occurs in the process of reflecting the external intervention torques, it may be misdiagnosed as normal even though there is an error in the basic control logic.

The above information disclosed in this Background section is only to enhance understanding of the background of the present disclosure. Therefore the Background section may contain information that does not form prior art that is already known to a person having ordinary skill in the art.

SUMMARY

The present disclosure has been made in an effort to solve the above-described problems associated with the prior art. Objects of the present disclosure are to provide a system and method for monitoring torque in a hybrid electric vehicle capable of preventing misdiagnosis in determining whether there is an abnormality in determining torque and generating commands in basic control logic to thereby accurately perform torque monitoring.

The objects of the present disclosure are not limited to the foregoing. Other objects not mentioned herein may be more clearly understood by those having ordinary skill in the art to which the present disclosure pertains based on the description below.

In one aspect, a method for monitoring torque in a hybrid electric vehicle is provided. The method includes determining, by a controller, a driver request torque and a travel mode of the hybrid electric vehicle. The method also includes distributing, by the controller, the driver request torque to each power sources, among power sources in the hybrid electric vehicle, based on the travel mode. The method additionally includes adding, by the controller, an intervention torque to the distributed torque for each power source. The method also includes determining, by the controller, a command torque for each power source after reflecting the intervention torque. The method further still includes determining, by the controller, a request torque to be monitored based on vehicle operation information. The method also includes determining, by the controller, based on the determined command torque for each power source after reflecting the intervention torque and the distributed command torque for each power source before reflecting the intervention torque, a compensation value in which the intervention torque is considered for each power source. The method further includes limiting, by the controller, the compensation value for each power source to a corresponding driving system limit value among respective driving system values for the power sources in the hybrid electric vehicle. The method further still includes determining, by the controller, a command torque limit value using the corresponding limited compensation value and the determined request torque to be monitored. The method additionally includes determining, by the controller, whether there is an abnormality in determining the command torques for each power source based on a comparison of the determined command torque limit value with a sum of the command torques for the power sources.

In an embodiment, limiting the determined compensation value to the corresponding driving system limit value may include subtracting the command torque for the power source before reflecting the intervention torque from the command torque for the power source after reflecting the intervention torque to determine compensation values for the power source, and limiting the determined compensation values for the power source using corresponding driving system limit values.

In an embodiment, determining the command torque limit value may include determining a total compensation value by summing the limited compensation values for each power source. Determining the command torque limit value may further include determining the command torque limit value using the determined total compensation value and the request torque to be monitored.

In an embodiment, determining the command torque limit value may include determining the command torque limit value by summing the total compensation value and the request torque to be monitored.

In an embodiment, the power sources may include an engine and a motor configured to drive the vehicle, and a hybrid starter and generator (HSG) connected to the engine to transmit power so as to start the engine or generate power using engine power.

In an embodiment, the driving system limit values may include an engine system limit value, a motor system limit value, and an HSG system limit value. The engine system limit value may be determined depending on engine speed and travel mode. The motor system limit value and the HSG system limit value may be determined depending on a state of charge (SOC) of a main battery.

In an embodiment, the power sources may include an engine and a motor configured to drive the vehicle, and a hybrid starter and generator (HSG) connected to the engine to transmit power so as to start the engine or generate power using engine power.

In an embodiment, determining the command torque limit value may include determining the command torque limit value using a value obtained by summing the limited compensation value and the request torque to be monitored.

In an embodiment, determining whether there is an abnormality in determining the command torques for each power source may include: when the command torque limit value is equal to or smaller than a sum of the command torques for each power source, determining that there is an abnormality in determining the command torques for each power source; and when the command torque limit value is greater than the command torques for each power source, determining that the determining the command torques for each power source is normal.

In another aspect, a system for monitoring torque in a hybrid electric vehicle is provided. The system includes a controller configured to determine a driver request torque and a travel mode of the hybrid electric vehicle. The controller is also configured to distribute the driver request torque to each of power sources, among power sources in the vehicle, based on the determined travel mode. The controller is further configured to add an intervention torque to the distributed torque for each power source to determine a command torque for each power source after reflecting the intervention torque. The controller is further configured to determine a request torque to be monitored based on vehicle operation information. The controller is additionally configured to determine, based on the determined command torque for each power source after reflecting the intervention torque and the distributed command torque for each power source before reflecting the intervention torque, a compensation value in which the intervention torque is considered for each power source. The controller is further configured to limit the determined compensation value to a driving system limit value. The controller is further still configured to determine a command torque limit value using the limited compensation value and the determined request torque to be monitored. The controller is further yet configured to determine whether there is an abnormality in determining the command torques for each power source based on a comparison of the determined command torque limit value with a sum of the command torques for each power source.

In an embodiment, the controller may be configured to subtract the command torque for each power source before reflecting the intervention torque from the command torque for each power source after reflecting the intervention torque to determine compensation values for each power source. The controller may also be configured to limit the determined compensation values for each power source using a corresponding driving system limit value among respective driving system values for the power sources.

In an embodiment, the controller may be configured to determine a total compensation value by summing the limited compensation values for each power source. The controller may also be configured to determine the command torque limit value using the determined total compensation value and the request torque to be monitored.

In an embodiment, the controller may be configured to determine the command torque limit value by summing the total compensation value and the request torque to be monitored.

In an embodiment, the power sources may include an engine and a motor configured to drive the vehicle, and a hybrid starter and generator (HSG) connected to the engine to transmit power so as to start the engine or generate power using engine power.

In an embodiment, the driving system limit values may include an engine system limit value, a motor system limit value, and an HSG system limit value. The engine system limit value may be determined depending on engine speed and travel mode, and the motor system limit value and the HSG system limit value may be charge and discharge limit values determined depending on a state of charge (SOC) of a main battery.

In an embodiment, the controller may be configured to determine a command torque limit value using a value obtained by summing the limited compensation value and the request torque to be monitored.

In an embodiment, the controller may be configured to, when the command torque limit value is equal to or smaller than a sum of the command torques for each power source, determine that there is an abnormality in a process of determining the command torques for each power source. The controller may also be configured to, when the command torque limit value is greater than the command torques for each power source, determine that the process of determining the command torques for each power source is normal.

Other aspects and embodiments of the present disclosure are described below.

It should be understood that the term "vehicle" or "vehicular" or other similar terms as used herein are inclusive of motor vehicles in general. Such motor vehicles may encompass passenger automobiles including sport utility vehicles (SUV), buses, trucks, various commercial vehicles, watercraft including a variety of boats and ships, aircraft, and the like. Such motor vehicle may also include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, a vehicle powered by both gasoline and electricity.

The above and other features of the present disclosure are described below.

BRIEF DESCRIPTION OF THE DRAWINGS

The above and other features of the present disclosure are described in detail below with reference to certain embodiments thereof illustrated in the accompanying drawings, which are given hereinbelow by way of illustration only, and thus are not limitative of the present disclosure, and in which:

FIG. 1 is a block diagram showing the structure of a control system configured to perform power control and shift control in a hybrid electric vehicle;

Figure 2:
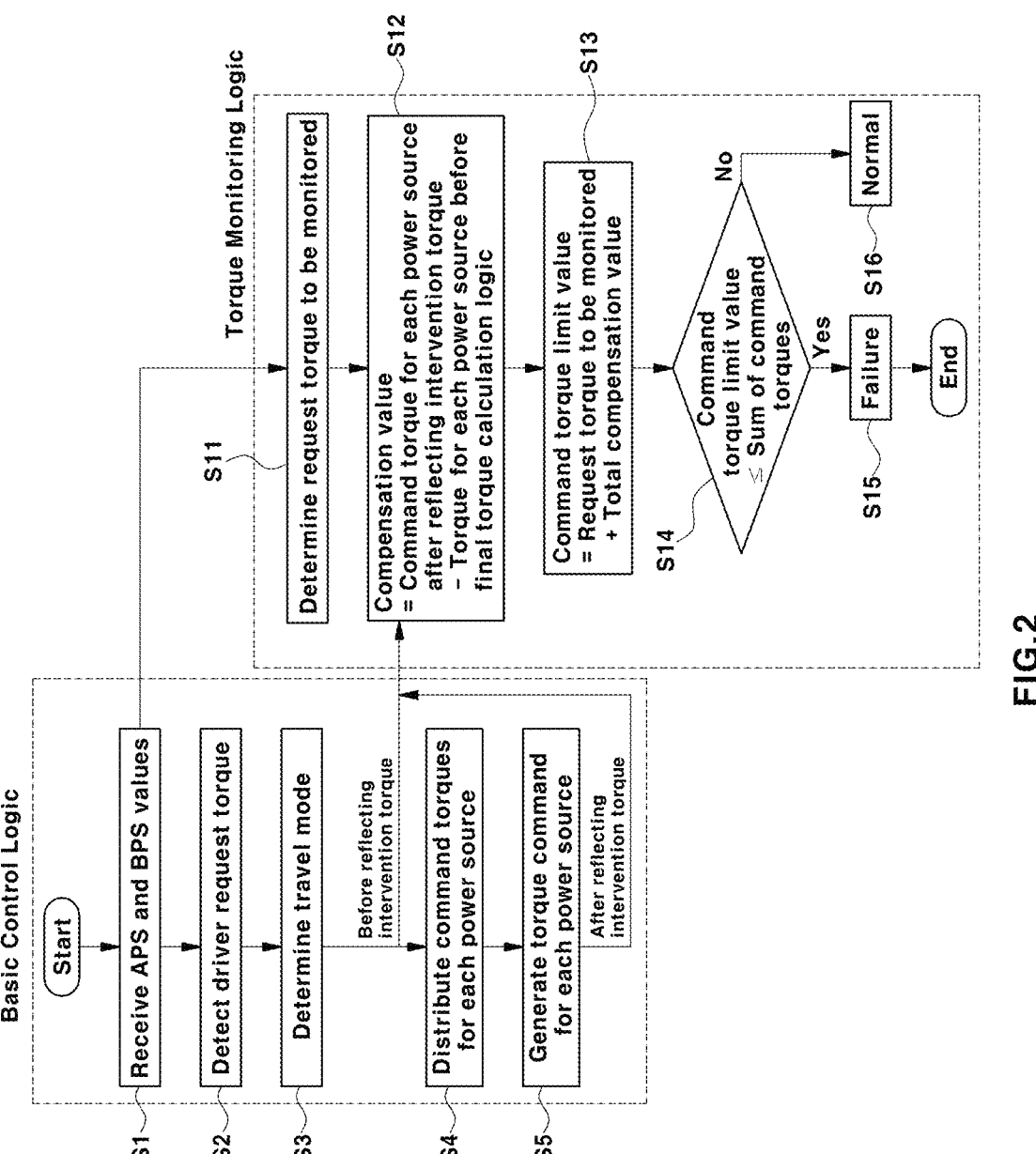
FIG. 2 is a flowchart showing a method for monitoring a torque according to the related art.

It should be understood that the appended drawings are not necessarily drawn to scale, presenting a somewhat simplified representation of various features illustrative of the basic principles of the present disclosure. The specific design features of the present disclosure, including, for example, specific dimensions, orientations, locations, and shapes, will be determined in part by the particular intended application and usage environment.

In the figures, identical reference numbers refer to the same or equivalent parts of the present disclosure throughout the several figures of the drawings.

DETAILED DESCRIPTION

Hereinafter, embodiments of the present disclosure are described in detail with reference to the accompanying drawings. Descriptions of specific structures or functions presented in the embodiments of the present disclosure are merely illustrative for the purpose of explaining the embodiments according to the concept of the present disclosure. The embodiments according to the concept of the present disclosure may be implemented in various forms. In addition, the descriptions should not be construed as being limited to the embodiments described herein, and should be understood to include all modifications, equivalents and substitutes falling within the idea and scope of the present disclosure.

In the present disclosure, terms such as "first" and/or "second" may be used to describe various components, but the components are not limited by the terms. These terms are only used to distinguish one component from another. For example, a first component could be termed a second component, and similarly, a second component could be termed a first component, without departing from the scope of embodiments of the present disclosure.

It should be understood that, when a component is referred to as being "connected to" or "brought into contact with" another component, the component may be directly connected to or brought into contact with the other component, or one or more intervening components may also be present. In contrast, when a component is referred to as being "directly connected to" or "directly brought into contact with" another component, there is no intervening component present. Other terms used to describe relationships between components should be interpreted in a like fashion (e.g., "between" versus "directly between," "adjacent" versus "directly adjacent," etc.).

Throughout the specification, like reference numerals indicate like components. The terminology used herein is for the purpose of illustrating embodiments and is not intended to limit the present disclosure. In this specification, the singular form includes the plural sense, unless specified otherwise. The terms "comprises" and/or "comprising" used in this specification mean that the cited component, step, operation, and/or element does not exclude the presence or addition of one or more of other components, steps, operations, and/or elements. The same is intended for words such as "have" and "include" and variations.

When a component, device, element, or the like of the present disclosure is described as having a purpose or performing an operation, function, or the like, the component, device, or element should be considered herein as being "configured to" meet that purpose or perform that operation or function.

The term "unit", "module", "controller", or the like, used in the present disclosure signifies one unit that processes at least one function or operation, and may be realized by hardware, software, or a combination thereof. The operations of the method or the functions described in connection with the forms disclosed herein may be embodied directly in a hardware or a software module executed by a processor, or in a combination thereof.

According to embodiments of the present disclosure, a system and method for monitoring torque in a hybrid electric vehicle are provided and are capable of preventing misdiagnosis in determining whether there is an abnormality in determining torques and generating commands. More particularly, according to embodiments of the present disclosure, a system and method are provided that are capable of preventing misdiagnosis due to errors in the process of reflecting external intervention torque. Accordingly, torque monitoring may be accurately performed.

Hereinafter, before describing embodiments of the present disclosure, problems in the related art are described in more detail to help understand the present disclosure.

FIG. 2 is a flowchart showing a method for monitoring a torque according to the related art. FIG. 2 shows basic control logic for determining torque and generating command for each power source in a hybrid electric vehicle and torque monitoring logic of the related art. In the following description, the power source includes an engine and a motor configured to drive the vehicle. The power source also includes a hybrid starter and generator (HSG), which is a motor configured to start the engine and to generate power using engine power.

First, a controller receives driver's operation input value, for example, driver's pedal input value (e.g., APS value and BPS value) at a step or operation S1. At a step or operation S2, the controller determines a driver request torque in the basic control logic of the controller to generate torque commands for each power source based on vehicle operation information, such as the driver's operation input value.

For example, in the basic control logic of the controller, an accelerator pedal input value (APS value) detected by an accelerator pedal position sensor or a brake pedal input value (BPS value) detected by a brake pedal position sensor may be received to determine a driver request torque corresponding to the accelerator pedal input value or to the brake pedal input value.

At a step or operation S3, the basic control logic determines vehicle's travel mode (powertrain (PT) mode) based on charging and discharging information, such as a charging and discharging strategy depending on the determined driver request torque and the state of a battery. At a step or operation S4, the controller distributes the driver request torque to each power source depending on the determined travel mode to determine torques for each power source (i.e., engine torque, motor torque, and HSG torque). The engine torque, motor torque, and HSG torque are torques before reflecting the intervention torque, i.e., command torques for each power source before reflecting the intervention torque distributed from the driver request torque.

At a step or operation S5, the controller selectively reflects, according to a torque distribution logic in the basic control logic, intervention torque, such as shift, ASC, and TCS received from other controllers, in the determined torques for each power source to determine final torques for each power source (command value). The controller thus generates and outputs final torque commands for each power source.

When reflecting the intervention torque in the torque distribution logic, the intervention torque may be added to the torques for each power source, i.e., the engine torque, motor torque, and HSG torque, distributed from the request torque to determine final torques for each power source. Thereafter, final torque commands for each power source are generated using the determined final torques as command values and then are outputted.

Here, the torque commands for each power source, i.e., engine torque command, motor torque command, and HSG torque command, are commands to control the operation of each of the corresponding power sources. A cooperative control to control the operations of the engine, motor, and HSG is performed according to each of the corresponding torque commands.

The torque distribution logic is a logic in which intervention torque, such as shift, ASC, and TCS, is added to the torques for each power source to calculate command torque (final torque command value) before torque commands for each power source are generated. The command torque for each power source to which the intervention torque is added is referred to herein as "command torque for each power source after reflecting intervention torque". The command torque for each power source after reflecting intervention torque is a final command value obtained after final torque calculation logic is performed.

Apart from the torque determination and command generation performed in the basic control logic, the torque monitoring logic in the controller configured to monitor torque determines a request torque to be monitored based on vehicle operation information, such as driver's operation input value, at a step or operation S11.

For example, based on the accelerator pedal input value (APS value) or the brake pedal input value (BPS value) used to determine a driver request torque in the basic control logic, the request torque to be monitored may be separately determined in the torque monitoring logic in the controller.

The process of determining the request torque to be monitored in the torque monitoring logic may be structured by shortening the process of determining the driver request torque in the basic control logic.

Moreover, the torque monitoring logic receives the command torque for each power source after reflecting intervention torque by the torque distribution logic (torque command value) from the basic control logic. The torque monitoring logic also receives the determined command torque for each power source before reflecting intervention torque (torque before final torque calculation logic) from the driver request torque.

Thereafter, based on the received command torque for each power source after reflecting intervention torque (torque command value) and the command torque for each power source before reflecting intervention torque ("torques for each power source before final torque calculation logic" in FIG. 2), at a step or operation S12, the torque monitoring logic determines individual compensation value for each power source in which torque intervention is considered. At a step or operation S13, the controller adds, to individual compensation value for each power source in which torque intervention is considered, the determined compensation value for each power source to determine a total compensation value (i.e., a total sum of compensation values for each power source), and adds the determined total compensation value to the request torque to be monitored to determine a command torque limit value.

In the process of determining the compensation value, the controller subtracts the command torque for each power source before reflecting intervention torque from the command torque for each power source after reflecting intervention torque (torque command value) to determine compensation value for each power source. The controller then adds up the determined compensation values for each power source to determine a total compensation value.

In other words, the controller determines the total compensation value by summing i) an engine torque compensation value obtained by subtracting the engine torque distributed before reflecting intervention torque from the engine command torque (engine torque command value) after reflecting intervention torque, ii) a motor torque compensation value obtained by subtracting the motor torque distributed before reflecting intervention torque from the motor command torque (motor torque command value) after reflecting intervention torque, and iii) an HSG torque compensation value obtained by subtracting the HSG torque before reflecting intervention torque from the HSG command torque (HSG torque command value) after reflecting intervention torque.

Here, some of the engine torque, motor torque, and HSG torque before and after reflecting intervention torque may be 0 depending on the travel mode (PT mode). As such, the determined total compensation value is added to the request torque to be monitored to determine the command torque limit value.

The command torque received from the basic control logic to determine compensation value for each power source at the step or operation S12 is command torque for each power source after reflecting intervention torque (torque command value), which is a command torque for each power source after final torque calculation logic.

Furthermore, the command torque for each power source before reflecting intervention torque subtracted from the command torques for each power source to determine compensation value for each power source at the step or operation S12 may be a torque for each power source before final torque calculation logic. Therefore, the compensation value for each power source may be a value obtained by subtracting the torque for each power source before final torque calculation logic from the command torque for each power source after final torque calculation logic.

In a step or operation S14, the torque monitoring logic compares the determined command torque limit value with the sum of the command torque for each power source after reflecting the intervention torque (torque command value for each power source) received from the basic control logic, i.e., the final torque command value for each power source, to diagnose whether there is an abnormality in the basic control logic, where the final torque command value for each power source is the sum of engine command torque, motor command torque, and HSG command torque.

When the command torque limit value is equal to or smaller than the sum of the command torques for each power source, it is judged that there is an abnormality in the basic control logic at a step or operation step S15. Otherwise, the basic control logic is judged to be normal at a step or operation S16.

As such, the torque monitoring logic uses the command torque for each power source after reflecting intervention torque and the torque for each power source before reflecting intervention received from the basic control logic to determine a compensation value in which intervention torque is considered.

The compensation value (total compensation value) added to the request torque to be monitored is determined by summing the values obtained by subtracting i) the engine torque, motor torque, and HSG torque values distributed before reflecting intervention from ii) the engine command torque, motor command torque, and HSG command torque values after reflecting intervention torque. However, regarding the compensation value in the related art, the output limit for the system is not taken into account. In other words, there is no limit in the compensation value.

For this reason, errors might occur in the process of adding intervention torque to torques for each power source distributed in the torque distribution logic of the basic control logic, thereby excessively increasing command torques for each power source used to calculate the compensation value in the torque monitoring logic.

When the excessively increased command torque for each power source after reflecting intervention torque in the basic control logic is transmitted to the torque monitoring logic, the torque monitoring logic subtracts the command torque for each power source before reflecting intervention torque from the excessively increased command torque for each power source after reflecting intervention torque. This also increases the compensation value that considered the torque intervention, and thus the command torque limit value to which the compensation value is reflected also increases, which may eventually lead to misdiagnosis.

Referring to the flowchart in FIG. 2, whether there is an abnormality is determined at the step or operation S14 by comparing the command torque limit value with the sum of command torques for the power sources. When the command torque limit value is abnormally increased, although there is an abnormality in determining toques and generating commands in the basic control logic, the process may be misdiagnosed to be normal in the operation or step S16.

According to embodiments of the present disclosure, the command torque limit value obtained by adding the compensation value to the request torque to be monitored is compared with the sum of the command torques for the power sources, but the compensation value for each power source is limited to the driving system limit value so that the command torque limit value, that is compared with the sum of the command torques for the power sources, is prevented from being excessively increased due to an error in the basic control logic.

When the compensation value for each power source is limited to the driving system limit value as described above, the command torque limit value may be prevented from being abnormally increased and errors in the torque distribution logic and the like in the basic control logic may be accurately diagnosed, strengthening the torque monitoring logic to thereby secure stability.

The compensation value added to the request torque to be monitored at the step or operation S13 in FIG. 2 is a total compensation value obtained by adding up all the compensation values for the power sources limited to the corresponding system limit values for the power sources. Further, the sum of the command torques for the power sources is a value obtained by summing the command torques for the power sources inputted to the torque monitoring logic after being determined in the basic control logic, i.e., the sum of the engine torque, motor torque, and HSG torque after reflecting the intervention torque by the torque distribution logic. In other words, the sum of the command torques for the power sources is the torque obtained by adding up all the torque command values for the power sources generated at the step or operation S5 in FIG. 2.

Moreover, the driving system limit values may include an engine system limit value, motor system limit value, and HSG system limit value. In other words, the compensation values for each power source obtained by subtracting the command torque for each power source before reflecting intervention torque from the command torque for each power source after reflecting intervention torque (torque command values) are limited to the engine system limit value, the motor system limit value, and the HSG system limit value, respectively. Furthermore, the compensation values for each power source limited by the respective system limit values are summed to determine the total compensation value (total sum of compensation values for each power source). The determined total compensation value is then added to the request torque to be monitored to determine the command torque limit value.

According to embodiments of the present disclosure, the system limit value is a torque value that the engine and motor (driving motor, HSG) can produce through the system. According to embodiments of the present disclosure, the engine system limit value may be determined by the controller based on the engine speed (rpm), the travel mode (PT mode), etc. Further, according to embodiments of the present disclosure, the motor system limit value and HSG system limit value may be charge and discharge limit values determined based on the state of charge (SOC) of the main battery.

Figure 3:
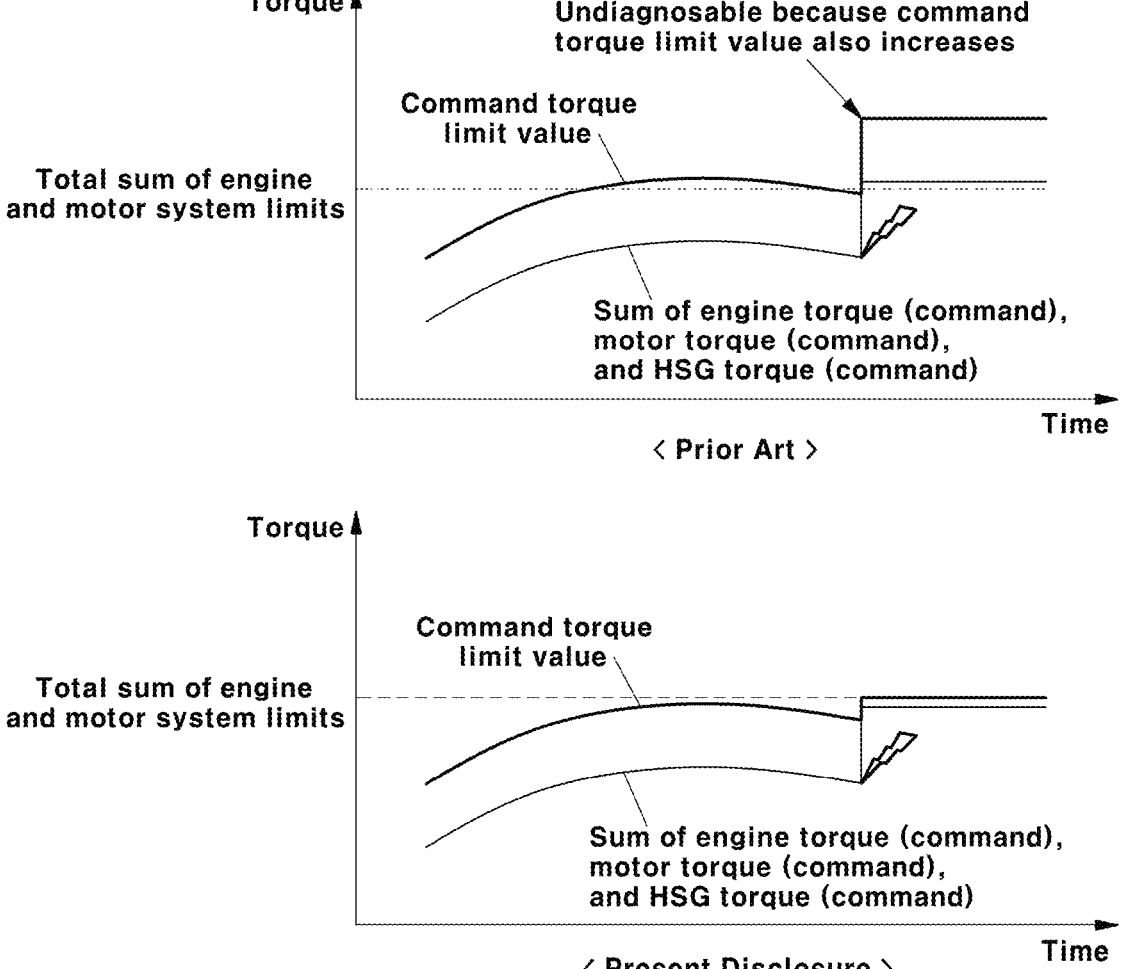
FIG. 3 shows graphs illustrating a command torque limit value and a sum of command torques for each power source in a method for monitoring torque according to the related art and according to an embodiment of the present disclosure, respectively.

FIG. 3 shows graphs each showing a command torque limit value and a sum of command torques for each power source in the method for monitoring a torque according to the related art and according to embodiments of the present disclosure, respectively. The graphs of FIG. 3 show a comparison between the related art without applying the limit and embodiments of the present disclosure applying the limit.

The command torque limit value in FIG. 3 is obtained by adding a compensation value to a request torque to be monitored. Further, the sum of the engine torque, motor torque, and HSG torque is a value obtained by adding up all of the command torques for the power sources after reflecting intervention torque distributed by the torque distribution logic, i.e., the sum of the torque command values for the engine, motor, and HSG.

As shown in FIG. 3, according to the related art, the compensation value is not limited to the system limit value.

Accordingly, when the command torque for each power source after reflecting intervention torque is excessively increased due to an error in the basic control logic, the compensation value is excessively increased, overly increasing the command torque limit value.

As a result, because the command torque limit value is abnormally increased and thus the command torque limit value is always greater than the sum of the command torques for the power sources, it may be misdiagnosed to be normal although there is an error in the basic control logic, making accurate diagnosis impossible.

However, according to embodiments of the present disclosure, the compensation value is limited to the sum of the engine and motor (driving motor, HSG) system limit values, preventing the command torque limit value from being abnormally increased, and thus it may be accurately diagnosed when there is an error in the torque distribution logic, etc.

In other words, in the related art, because a compensation value greater than the torque that the engine and motor may systematically produce may be added to the request torque to be monitored, when an error occurs in the torque distribution logic, the command torque limit value also increases, making diagnosis impossible.

Conversely, according to embodiments of the present disclosure, when an error occurs in the torque distribution logic, the command torque limit value increases but is prevented from being abnormally increased, so when an error occurs in the torque distribution logic, it can be accurately diagnosed.

Figure 4:
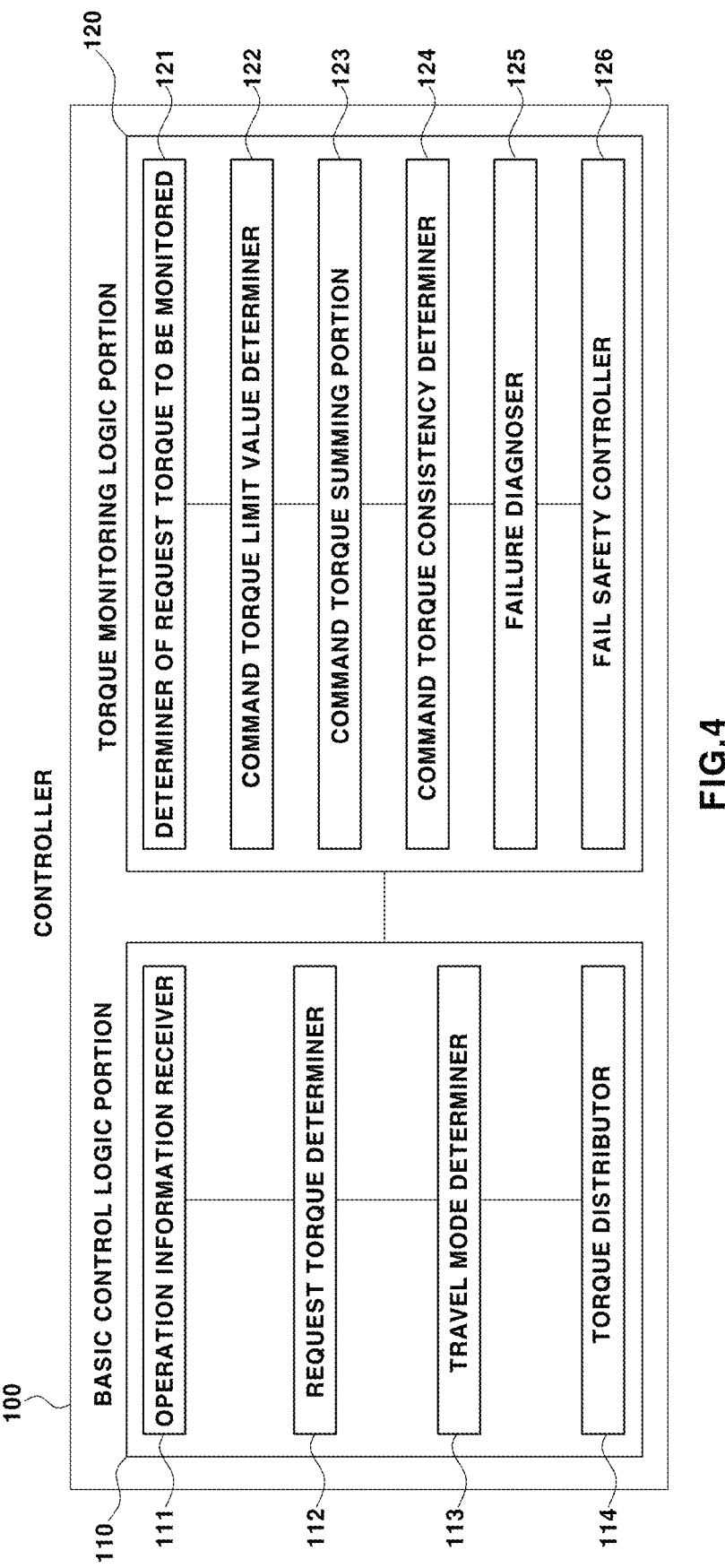
FIG. 4 is a block diagram showing the structure of a controller configured to perform a process of diagnosing the monitoring of torque according to an embodiment the present disclosure.

FIG. 4 is a block diagram showing the structure of a controller configured to perform a process of diagnosing the monitoring of torque, according to an embodiment of the present disclosure. The block diagram of FIG. 4 also shows the components configured to perform the basic control logic, according to an embodiment.

Figure 5:
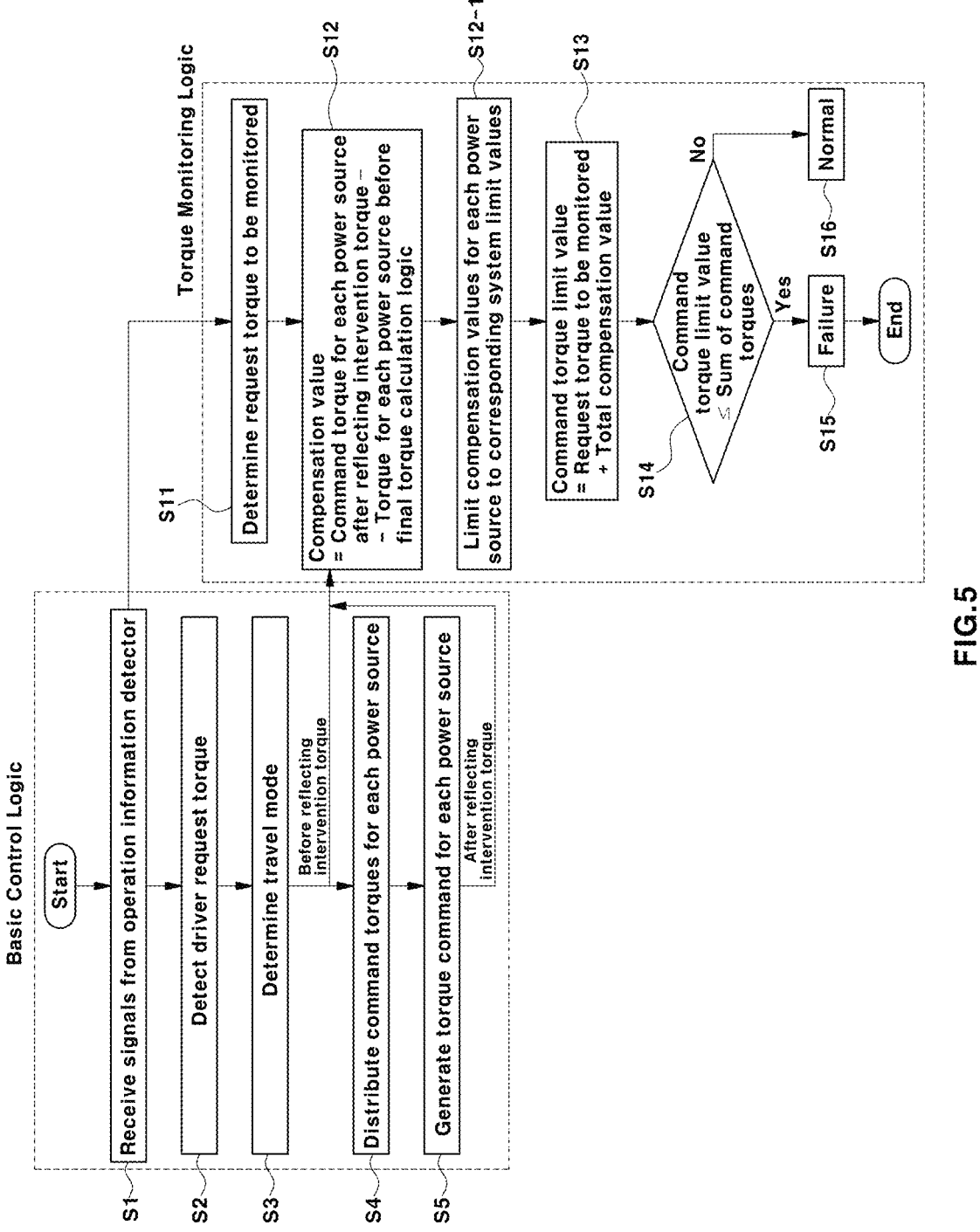
FIG. 5 is a flowchart showing the process of diagnosing the monitoring of torque according to an embodiment of the present disclosure.

FIG. 5 is a flowchart showing the process of diagnosing the monitoring of torque according to an embodiment of the present disclosure. The flowchart of FIG. 5 also shows the process of generating torque commands for each power source in the basic control logic.

With the components in FIG. 4, when an error occurs in the torque distribution logic of the basic control logic, in which an intervention torque is added to the torque for each power source distributed from the driver request torque to determine torques for each power source after reflecting intervention torque (command torques, i.e., torque command values for each power source), excessively increasing the command torque, the error may be diagnosed. In an embodiment of the present disclosure, a controller 100 is configured to perform a process of diagnosing monitoring of torque. The controller 100 may be an HCU, which is a higher-level controller, or a vehicle domain control unit (VDCU) in which a plurality of controllers including the HCU is integrated.

The controller 100 may be mounted in a vehicle, and may serve to control the torque of the vehicle drive system depending on driver's request. The controller 100 may also monitor whether the torque value of the command outputted to each power source is reliable.

In the example of FIG. 4, the controller 100 includes a component configured to perform basic control logic, i.e., a basic control logic portion 110. The basic control logic portion 110 includes an operation information receiver 111, a request torque determiner 112, a travel mode determiner 113, and a torque distributor 114.

Referring to FIGS. 4 and 5, at the step or operation S1, the operation information receiver 111 receives signals from an operation information detector, such as an accelerator pedal position sensor (APS) and a brake pedal position sensor (BPS) (e.g., APS signal and BPS signal). At the step or operation S2, the request torque determiner 112 determines a driver request torque based on the vehicle operation information, i.e., the vehicle operation information including driver's operation input values, such as accelerator pedal input values, obtained by the signals received from the operation information detector.

At the step or operation S3, the travel mode determiner 113 determines a travel mode (e.g., powertrain (PT) mode) of the vehicle based on charging and discharging information, such as discharging strategies depending on the determined driver request torque and the state of a battery. At the step or operation S4, the torque distributor 114 distributes the driver request torque to each power source depending on the determined travel mode to determine command torques for each power source in which intervention torque is finally reflected.

The torque distributor 114 performs torque distribution logic. In the torque distribution logic, an intervention torque is added to the torque for each power source distributed from the driver request torque to determine a final command torque for each power source in which intervention torque is reflected at the step or operation S4. When the command torque for each power source is determined, a torque command for each power source is generated and outputted at the step or operation S5.

As such, in the process of performing basic control logic, a command torque for each power source before reflecting intervention torque (torque before final torque calculation logic) and a command torque for each power source after reflecting intervention torque (torque after final torque calculation logic) are transmitted to the torque monitoring logic.

When the basic control logic is performed, the torque monitoring logic may be performed in the controller 100 at the same time. The controller 100 further includes a component configured to perform torque monitoring logic, i.e., a torque monitoring logic portion 120.

The torque monitoring logic portion 120 may include a determiner of request torque to be monitored 121, a command torque limit value determiner 122, a command torque summing portion 123, a command torque consistency determiner 124, a failure diagnoser 125, and a fail safety controller 126.

Similar to the request torque determiner 112 in the basic control logic, the determiner of request torque to be monitored 121 in the torque monitoring logic determines a driver request torque based on the vehicle operation information including driver's operation input value, such as an accelerator pedal input value. However, the determiner of request torque to be monitored 121 uses a process of determining a request torque, in which the process of determining a driver request torque in the basic control logic is shortened, to determine a request torque to be monitored.

As such, when the request torque to be monitored is determined through the process in which the process of determining the driver request torque in the basic control logic is shortened, at the step or operation S11, the command torque limit value determiner 122 adds a total compensation value (a total sum of compensation values for each power source) to the determined request torque to be monitored to determine a command torque limit value.

In an example, the compensation value is a value in which torque intervention performed by cooperative control with other controllers is considered. For example, the command torque limit value determiner 122 receives torques for each power source before reflecting torque intervention ("torques for each power source before final torque calculation logic" in FIG. 5) and torques for each power source after reflecting torque intervention (torque command value for each power source as final command torques for each power source) from the basic control logic portion 110. At the step or operation S12, the command torque limit value determiner 122 subtracts the torques for each power source before reflecting torque intervention (torque before final torque calculation logic) from the command torque for each power source after reflecting torque intervention to determine compensation values for each power source.

In an embodiment, the command torque limit value determiner 122 determines compensation values for each power source as described above, and then, at a step or operation S12-1, limits the compensation values for each power source to respective system limit values at vehicle level. In an example, the command torque limit value determiner 122 compares the compensation value for each power source with the limit value for the power source (e.g., engine system limit value, motor system limit value, and HSG system limit value) to limit each of the compensation values for each power source from exceeding the corresponding system limit values for the power source.

At the step or operation S13, the compensation values for the power sources limited by using the corresponding system limit values are added up to determine a total compensation value (a total sum of compensation values for each power source), and the determined total compensation value is added to the request torque to be monitored to calculate a command torque limit value.

The command torque received from the basic control logic to determine the compensation value for each power source at the step or operation S12 in FIG. 5 is, as in the related art described with reference to FIG. 2, a command torque for each power source after reflecting intervention torque (torque command value), which is a command torque for each power source after final torque calculation logic.

Furthermore, the command torque for each power source before reflecting intervention torque subtracted from the command torque for each power source to determine the compensation value for each power source at the step or operation S12 in FIG. 5 may be a torque for each power source before final torque calculation logic. Therefore, the compensation value for each power source may be a value obtained by subtracting the torque for each power source before final torque calculation logic from the command torque for each power source after final torque calculation logic.

The command torque summing portion 123 sums the command torques for each power source received from the basic control logic portion 110 (values reflecting intervention torque). At the step or operation S14, the command torque consistency determiner 124 then compares the command torque limit value determined by the command torque limit value determiner 122 with the command torques for each power source determined by the command torque summing portion 123 to determine whether the command torques are consistent.

When the command torque limit value is equal to or smaller than the sum of the command torques for each power source, the failure diagnoser 125 determines that there is an abnormality in command torque and diagnoses a failure (errors in torque distribution logic, etc.) at the step or operation S15, and allows the fail safety controller 126 to perform fail safety control. When the command torque limit value is greater than the sum of the command torques for each power source, the failure diagnoser 125 diagnoses the process as normal at the step or operation S16.

As described above, the system and method for monitoring a torque may prevent misdiagnosis in determining whether there is an abnormality in determining torques and generating commands in the basic control logic. Accordingly, torque monitoring may be accurately performed.

As should be apparent from the above description, the present disclosure provides the following effects.

In the system and method for monitoring a torque in the hybrid electric vehicle according to embodiments of the present disclosure, misdiagnosis in determining whether there is an abnormality in basic control logic may be prevented and the process of determining torques and generating commands may be accurately monitored.

According to embodiments of the present disclosure, errors in the processes of reflecting external intervention torque and determining compensation value, and misdiagnosis due to the errors may be prevented.

Although the present disclosure has been described in detail with reference to example embodiments, the scope of the present disclosure is not limited to the above-described embodiment. Various modifications and improvements by those having ordinary skill in the art using the basic concept of the present disclosure as defined in the claims below are also be included in the scope of the present disclosure.

What is claimed is:

1. A method for monitoring torque in a hybrid electric vehicle, the method comprising:

determining, by a processor, a driver request torque and a travel mode of the hybrid electric vehicle;

distributing, by the processor, the driver request torque to each power source, among power sources in the hybrid electric vehicle, based on the travel mode;

adding, by the processor, an intervention torque to the distributed driver request torque for each power source;

determining, by the processor, a command torque for each power source after reflecting the intervention torque;

determining, by the processor, a request torque to be monitored based on vehicle operation information;

subtracting, by the processor, the torque for each power source before reflecting the intervention torque from the command torque for each power source after reflecting the intervention torque to determine compensation values for each power source;

limiting, by the processor, the compensation value for each power source using a corresponding driving system limit value;

determining, by the processor, a command torque limit value for each power source using the corresponding limited compensation value and the request torque to be monitored; and determining, by the processor, whether there is an abnormality in determining the command torque for each power source based on a comparison of the command torque limit value with a sum of the command torques for the power sources.

2. The method according to claim 1, wherein determining the command torque limit value includes:

determining a total compensation value by summing the limited compensation values for the power sources; and determining the command torque limit value using the total compensation value and the request torque to be monitored.

3. The method according to claim 2, wherein determining the command torque limit value comprises determining the command torque limit value by summing the total compensation value and the request torque to be monitored.

4. The method according to claim 1, wherein the power sources include i) an engine and a motor configured to drive the hybrid electric vehicle and ii) a hybrid starter and generator (HSG) connected to the engine to transmit power so as to start the engine or generate power using engine power.

5. The method according to claim 4, wherein the driving system limit values include an engine system limit value, a motor system limit value, and an HSG system limit value, and wherein the engine system limit value is determined based on engine speed and travel mode, and the motor system limit value and the HSG system limit value are charge and discharge limit values determined based on a state of charge (SOC) of a main battery.

6. The method according to claim 1, wherein the power sources include i) an engine and a motor configured to drive the hybrid electric vehicle and ii) a hybrid starter and generator (HSG) connected to the engine to transmit power so as to start the engine or generate power using engine power.

7. The method according to claim 1, wherein determining the command torque limit value comprises determining the command torque limit value using a value obtained by summing the limited compensation value and the request torque to be monitored.

8. The method according to claim 1, wherein determining whether there is an abnormality in determining the command torques for each power source includes:

when the command torque limit value is equal to or smaller than a sum of the command torques for each power source, determining that there is an abnormality in determining the command torques for each power source; and when the command torque limit value is greater than the command torques for each power source, determining that determining the command torques for each power source is normal.

9. A system for monitoring a torque in a hybrid electric vehicle, the system comprising:

a processor configured to determine a driver request torque and a travel mode of the hybrid electric vehicle, distribute the driver request torque to each power source, among power sources in the hybrid electric vehicle, based on the travel mode, add an intervention torque to the distributed torque for each power source to determine a command torque for each power source after reflecting the intervention torque, determine a request torque to be monitored based on vehicle operation information, subtract the torque for each power source before reflecting the intervention torque from the command torque for each power source after reflecting the intervention torque to determine compensation values for each power source, limit the determined compensation values for each power source using a corresponding driving system limit value among respective driving system values for the power sources, determine a command torque limit value using the limited compensation value and the determined request torque to be monitored, and determine whether there is an abnormality in determining the command torques for each power source based on a comparison of the determined command torque limit value with a sum of the command torques for the power sources.

10. The system according to claim 9, wherein the processor is configured to:

determine a total compensation value by summing the limited compensation values for each power source, and determine the command torque limit value using the determined total compensation value and the request torque to be monitored.

11. The system according to claim 10, wherein the processor is configured to determine the command torque limit value by summing the total compensation value and the request torque to be monitored.

12. The system according to claim 9, wherein the power sources include i) an engine and a motor configured to drive the vehicle and ii) a hybrid starter and generator (HSG) connected to the engine to transmit power so as to start the engine or generate power using engine power.

13. The system according to claim 12, wherein the driving system limit values include an engine system limit value, a motor system limit value, and an HSG system limit value, and wherein:

the engine system limit value is determined based on engine speed and travel mode, and the motor system limit value and the HSG system limit value are charge and discharge limit values determined based on a state of charge (SOC) of a main battery.

14. The system according to claim 9, wherein the power sources include i) an engine and a motor configured to drive the vehicle and ii) a hybrid starter and generator (HSG) connected to the engine to transmit power so as to start the engine or generate power using engine power.

15. The system according to claim 9, wherein the processor is configured to determine a command torque limit value using a value obtained by summing the limited compensation value and the request torque to be monitored.

16. The system according to claim 9, wherein the processor is configured to:

when the command torque limit value is equal to or smaller than a sum of the command torques for each power source, determine that there is an abnormality in a process of determining the command torques for each power source; and when the command torque limit value is greater than the command torques for each power source, determine that the process of determining the command torques for each power source is normal.

* * * * *